US010951087B2

United States Patent
Ozawa et al.

(10) Patent No.: US 10,951,087 B2
(45) Date of Patent: Mar. 16, 2021

(54) ELECTRIC BRAKE MOTOR UNIT

(71) Applicant: ADVICS CO., LTD., Kariya (JP)

(72) Inventors: Takahiro Ozawa, Kariya (JP); Yuichi Takeo, Aichi-ken (JP); Yasuhito Hayashi, Nagoya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 16/478,535

(22) PCT Filed: Jan. 25, 2018

(86) PCT No.: PCT/JP2018/002332
§ 371 (c)(1),
(2) Date: Jul. 17, 2019

(87) PCT Pub. No.: WO2018/139550
PCT Pub. Date: Aug. 2, 2018

(65) Prior Publication Data
US 2020/0044510 A1 Feb. 6, 2020

(30) Foreign Application Priority Data
Jan. 25, 2017 (JP) .............................. JP2017-011638

(51) Int. Cl.
*H02K 5/22* (2006.01)
*H01R 4/02* (2006.01)
(Continued)

(52) U.S. Cl.
CPC ............ *H02K 5/225* (2013.01); *B60T 13/746* (2013.01); *F16D 65/18* (2013.01); *H01R 4/027* (2013.01);
(Continued)

(58) Field of Classification Search
CPC ........ H02K 5/225; H02K 3/28; H02K 7/1166; H01R 12/57
(Continued)

(56) References Cited

U.S. PATENT DOCUMENTS

| 5,600,193 A | 2/1997 | Matsushima et al. |
| 2008/0284272 A1* | 11/2008 | Honda ................... H02K 5/225 310/239 |
| 2014/0041975 A1 | 2/2014 | Takewaki et al. |

FOREIGN PATENT DOCUMENTS

| JP | h0799754 A | 4/1995 |
| JP | 2009011078 A | 1/2009 |

(Continued)

OTHER PUBLICATIONS

International Search Report (with English translation) and Written Opinion issued in corresponding International Patent Application No. PCT/JP2018/002332, 11 pages (dated Mar. 20, 2018).

*Primary Examiner* — Jose A Gonzalez Quinones
(74) *Attorney, Agent, or Firm* — Buchanan Ingersoll & Rooney PC

(57) ABSTRACT

The electric brake motor unit has: a motor; a connector having a connector terminal; a first section extending in a first direction and having a first contact portion electrically connected to the connector terminal; a second section extending in the first direction and having a second contact portion electrically connected to a motor terminal; and an intermediate section extending in a second direction intersecting with the first direction between the first section and the second section. The electric brake motor unit is provided with: a bus bar in which the first section, the intermediate section, and the second section are connected in a crank shape; and a motor bracket mounted on the motor and having two positioning portions that are mutually separately positioned with a space through which the intermediate section passes and are used for positioning the intermediate section in the first direction.

5 Claims, 6 Drawing Sheets

(51) Int. Cl.
*H02K 3/50* (2006.01)
*H02K 7/102* (2006.01)
*B60T 13/74* (2006.01)
*F16D 65/18* (2006.01)
*H02K 7/116* (2006.01)
*F16D 121/24* (2012.01)
*F16D 125/50* (2012.01)

(52) U.S. Cl.
CPC ............... *H02K 3/50* (2013.01); *H02K 7/102* (2013.01); *H02K 7/116* (2013.01); *F16D 2121/24* (2013.01); *F16D 2125/50* (2013.01); *H01R 4/029* (2013.01); *H02K 2203/09* (2013.01)

(58) Field of Classification Search
USPC .................... 310/71, 77, 234, 238, 239, 244
See application file for complete search history.

(56) References Cited

FOREIGN PATENT DOCUMENTS

| JP | 2012139079 A | * | 7/2012 |
|---|---|---|---|
| JP | 2012139079 A | | 7/2012 |
| JP | 2012-191792 A | | 10/2012 |
| JP | 2012229741 A | | 11/2012 |

* cited by examiner

ELECTRIC BRAKE MOTOR UNIT

TECHNICAL FIELD

The present invention relates to an electric brake motor unit.

BACKGROUND ART

Conventionally, an electric brake motor unit is known which decelerates the rotation of a motor serving a power source and converts it into a linear motion of a linear moving member, and presses a brake pad against a disk or a drum by the linear moving member (e.g., Patent Literature 1).

CITATIONS LIST

Patent Literature

Patent Literature 1: Japanese Unexamined Patent Publication No. 2012-229741

SUMMARY OF INVENTION

Technical Problems

In this type of electric brake motor unit, a motor bracket mounted on the motor supports a bus bar electrically connecting a connector terminal and a motor terminal on the opposite side of the motor. The bus bar is joined to each of the connector terminal and the motor terminal by welding or the like, whereby the connector terminal and the motor terminal are electrically connected by way of the bus bar.

In the electric brake motor unit having such a configuration, it is advantageous if the operation of joining the bus bar to each of the connector terminal and the motor terminal can be performed more easily or more reliably.

Therefore, one of the problems to be solved by the present invention is, for example, to provide an electric brake motor unit having a novel configuration with less inconvenience, such as being able to join the bus bar and each of the connector terminal and the motor terminal more easily or more reliably.

Solutions to Problems

An electric brake motor unit according to the present invention includes, for example, a motor serving as a power source including a motor terminal; a connector having a connector terminal; a bus bar that includes a first section including a first contact portion extending in a first direction and electrically connected to the connector terminal, a second section including a second contact portion extending in the first direction and electrically connected to the motor terminal, and an intermediate section extending in a second direction intersecting the first direction between the first section and the second section, the first section, the intermediate section, and the second section being connected to a crank shape; and a motor bracket mounted on the motor and including two positioning portions located away from each other with a gap through which the intermediate section passes and configured to position the intermediate section in the first direction.

In the electric brake motor unit described above, the intermediate section and furthermore the bus bar are positioned in the first direction by the two positioning portions. Therefore, according to such a configuration, the shift of the bus bar in the first direction is suppressed, whereby the bus bar and the connector terminal or the motor terminal can be more easily or more reliably joined compared to a case where the positioning portion is not provided. Furthermore, the configuration for positioning the bus bar can be realized by a relatively simple configuration.

DESCRIPTION OF EMBODIMENT

An exemplary embodiment of the present invention will be disclosed below. The configurations of the embodiment shown below, and the operations and results (effects) provided by the configurations are merely examples. The present invention can also be realized with configurations other than the configurations disclosed in the following embodiment. Furthermore, according to the present invention, it is possible to obtain at least one of the various effects (including derivative effects) obtained by the configuration.

In each figure, the direction is shown. The direction X, the direction Y, and the direction Z intersect (orthogonal) each other. The direction Z is the axial direction of the rotation center Ax1 of the motor 20, and the direction X and the direction Y intersect (orthogonal) with the direction Z.

Figure 1:
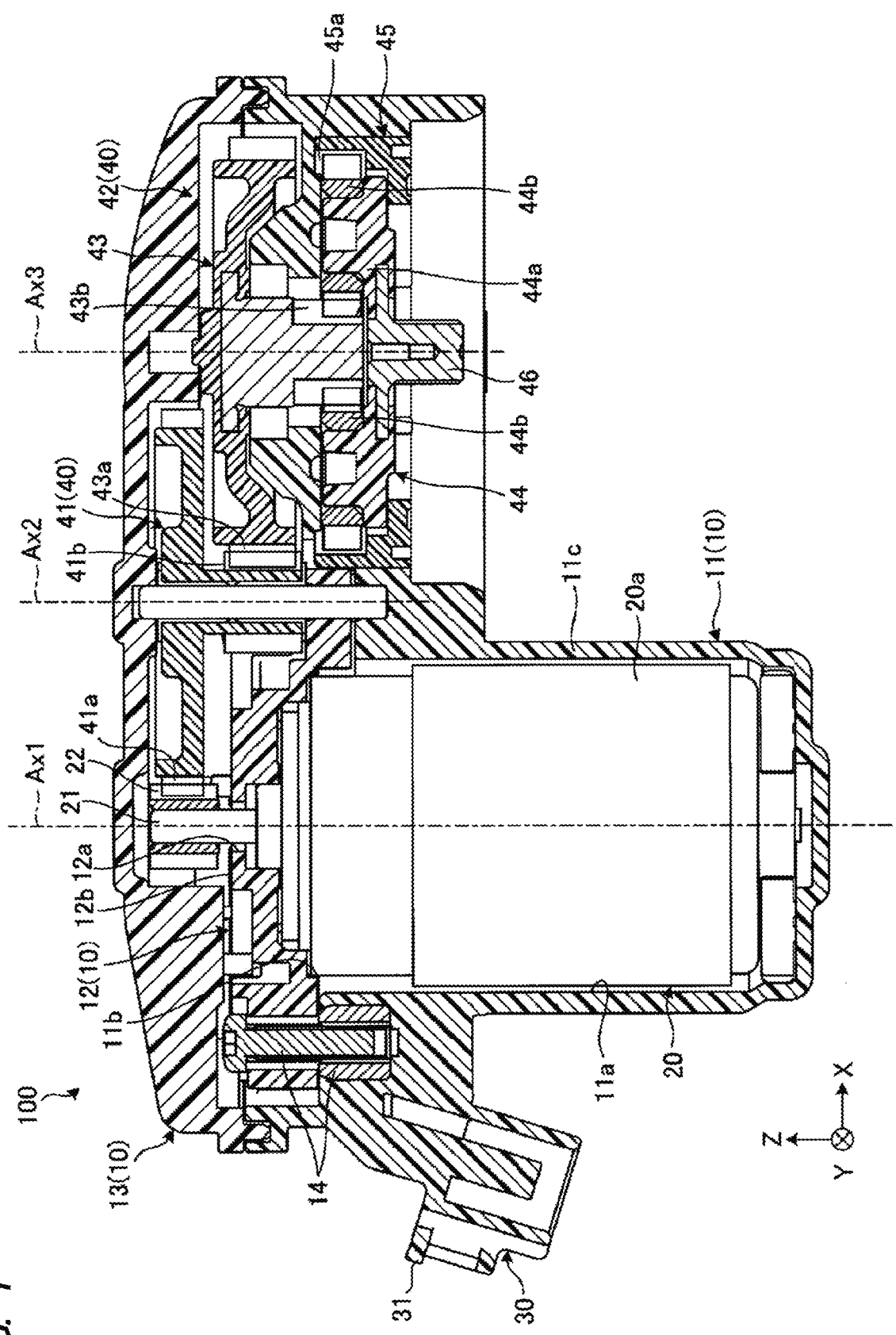
FIG. 1 is a schematic and exemplary cross-sectional view of an electric brake motor unit according to an embodiment.
Figure 2:
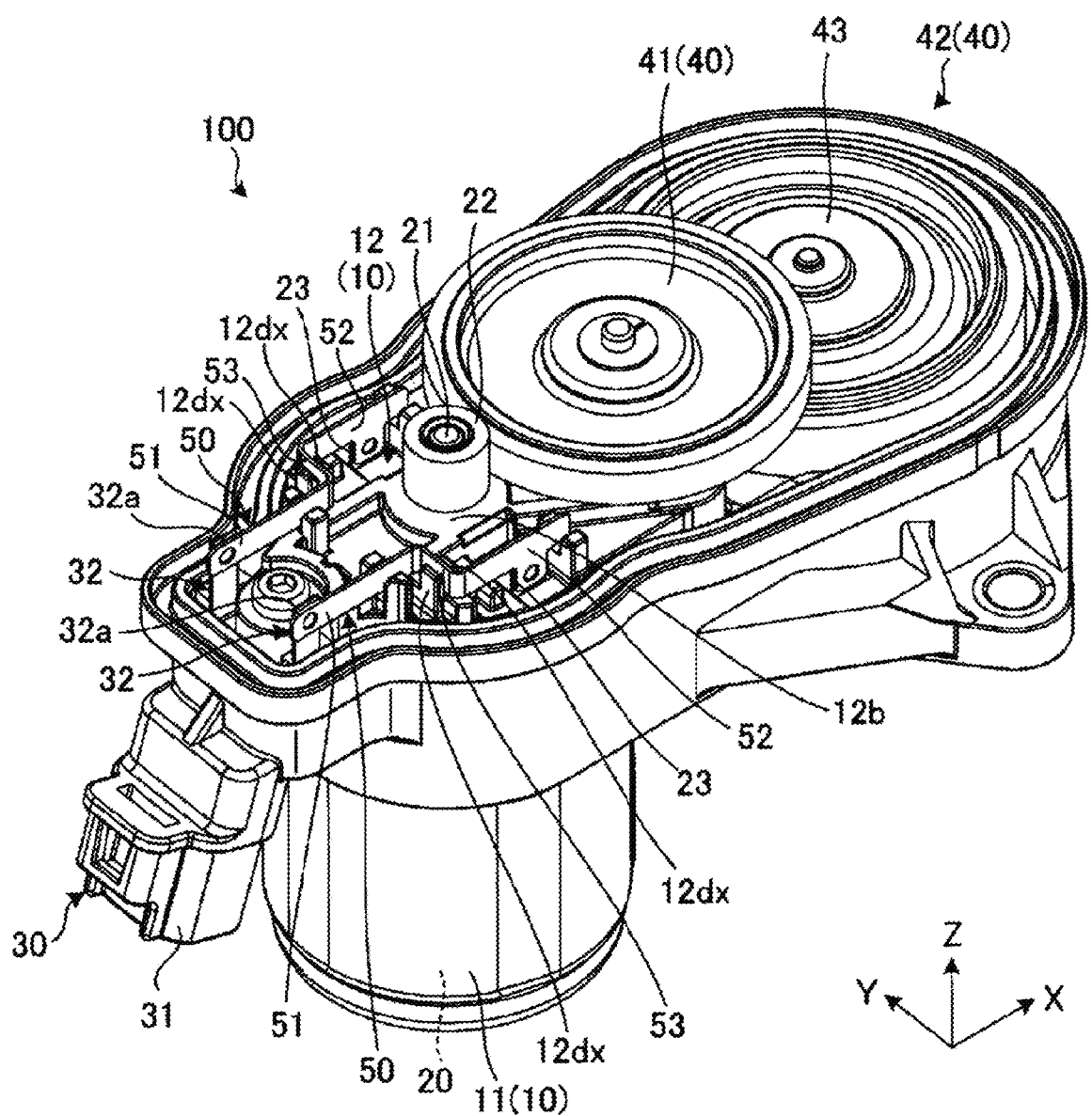
FIG. 2 is a schematic and exemplary perspective view showing an internal configuration of the electric brake motor unit according to the embodiment.

FIG. 1 is a cross-sectional view of an electric brake motor unit 100 of a vehicle brake. FIG. 2 is a perspective view showing an internal configuration of the electric brake motor unit 100.

As shown in FIG. 1, the electric brake motor unit 100 includes a housing 10. The housing 10 includes a casing 11, an inner cover 12 and an outer cover 13.

The casing 11 is provided with an accommodating portion 11*a* for accommodating a motor 20. The accommodating portion 11*a* is a cylindrical hole with a bottom. The motor 20 is accommodated in the accommodating portion 11*a* in a posture a shaft 21 is exposed from an open end 11*b* of the accommodating portion 11*a*. The side surface (circumferential surface) and the bottom surface of the motor 20 are covered by a wall portion 11*c* of the casing 11. The casing 11 is made of an insulating synthetic resin material.

The motor 20 is covered by the inner cover 12 from the side opposite to the casing 11. The inner cover 12 covers the open end 11*b* of the accommodating portion 11*a*. The inner cover 12 is provided with a through hole 12*a*, and the shaft 21 of the motor 20 is passed through the through hole 12*a* and is exposed to the side opposite to the motor 20 (body 20a), that is, the side opposite to the accommodating portion 11a of the inner cover 12. The inner cover 12 extends in a direction intersecting (orthogonal to) a rotation center Ax1. The inner cover 12 is coupled to the casing 11 by a coupling tool 14 such as a screw. The body 20a of the motor 20 is covered by the casing 11 and the inner cover 12. The inner cover 12 is attached to the motor 20. The inner cover 12 is made of an insulating synthetic resin material. The inner cover 12 is an example of a motor bracket.

As shown in FIGS. 1 and 2, the casing 11 includes a connector 30. The connector 30 includes a connector housing 31 and a connector terminal 32 (FIG. 2). In the present embodiment, as an example, the connector housing 31 is a part of the casing 11 and is integrally molded with the casing 11. The connector terminal 32 is integrally molded with the connector housing 31 (casing 11) by insert molding. The connector terminal 32 includes a contact portion (not shown) electrically connected to the terminal of the connector of a harness, and a contact portion 32a electrically connected to a bus bar 50 (FIG. 2). The connector terminal 32 passes through the casing 11 in the direction Z. The connector 30 may be a member different from the casing 11 attached to the casing 11.

As shown in FIG. 2, on an outer surface 12b of the inner cover 12 on the side opposite to the accommodating portion 11a, the bus bar 50 extending along the outer surface 12b is disposed. The inner cover 12 supports two bus bars 50 on the side opposite to the motor 20 (body 20a). The bus bars 50 electrically connect the connector terminal 32 and the motor terminal 23, respectively, and supply power from a battery (not shown) to the motor 20.

As shown in FIG. 1, the casing 11 supports a speed reduction mechanism 40 that decelerates the rotation of the motor 20. The speed reduction mechanism 40 includes a first gear 41 and a planetary gear mechanism 42. The speed reduction mechanism 40 is an example of a brake operation speed reduction mechanism.

The first gear 41 is rotatably provided around a rotation center Ax2 parallel to the rotation center Ax1, and includes an input gear 41a and an output gear 41b. The input gear 41a meshes with a pinion 22 fixed to the shaft 21 of the motor 20. The output gear 41b drives the planetary gear mechanism 42. The number of teeth of the output gear 41b is less than the number of teeth of the input gear 41a. Thus, the rotation of the motor 20 is decelerated by the first gear 41.

The planetary gear mechanism 42 has a sun gear 43, a planetary carrier 44, and a ring gear 45. The sun gear 43 and the planetary carrier 44 rotate around a rotation center Ax3 parallel to the rotation centers Ax1 and Ax2. The ring gear 45 is fixed to the casing 11. The sun gear 43 includes an input gear 43a and an output gear 43b. The input gear 43a meshes with the output gear 41b of the first gear 41. The output gear 43b drives the planetary carrier 44. The planetary carrier 44 includes a supporting portion 44a and a plurality of planetary pinions 44b rotatably supported by the supporting portion 44a. The ring gear 45 includes an inner gear 45a. The center of the inner gear 45a coincides with the rotation center Ax3. The planetary pinion 44b meshes with the input gear 43a of the sun gear 43 on the radially inward side of the rotation center Ax3, and meshes with the inner gear 45a of the ring gear 45 on the radially outward side of the rotation center Ax3. The planetary pinion 44b revolves around the sun gear 43. An output shaft 46 is provided on the supporting portion 44a of the planetary carrier 44. The rotation of the first gear 41 is decelerated by the planetary gear mechanism 42 and output from the output shaft 46. The output shaft 46 rotates a rotating portion of a rotation/linear motion conversion mechanism (not shown). The rotation/linear motion conversion mechanism converts the rotation of the output shaft 46 into the linear motion of a member that moves a brake pad (not shown).

As shown in FIG. 1, in the present embodiment, an outer peripheral portion of the outer cover 13 and an outer peripheral portion of the casing 11 are joined together by, for example, welding or the like. As apparent from FIGS. 1 and 2, the outer cover 13 covers the inner cover 12, the shaft 21 and the pinion 22 of the motor 20, the bus bar 50 (FIG. 2), the first gear 41, and the sun gear 43. The outer cover 13 is made of an insulating synthetic resin material.

Figure 3:
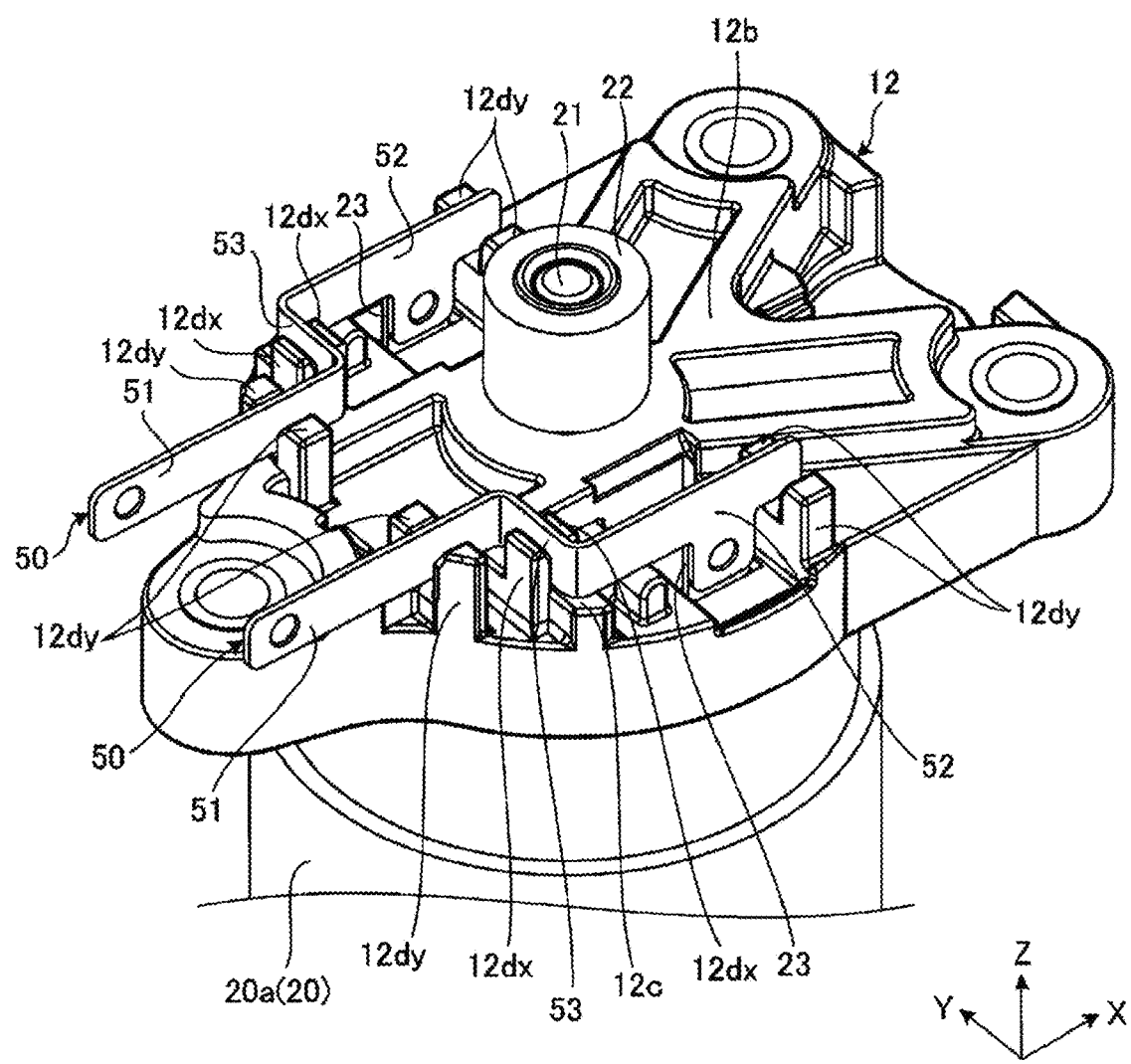
FIG. 3 is a schematic and exemplary perspective view of a subassembly including a motor, a motor bracket, and a bus bar of the electric brake motor unit according to the embodiment.
Figure 4:
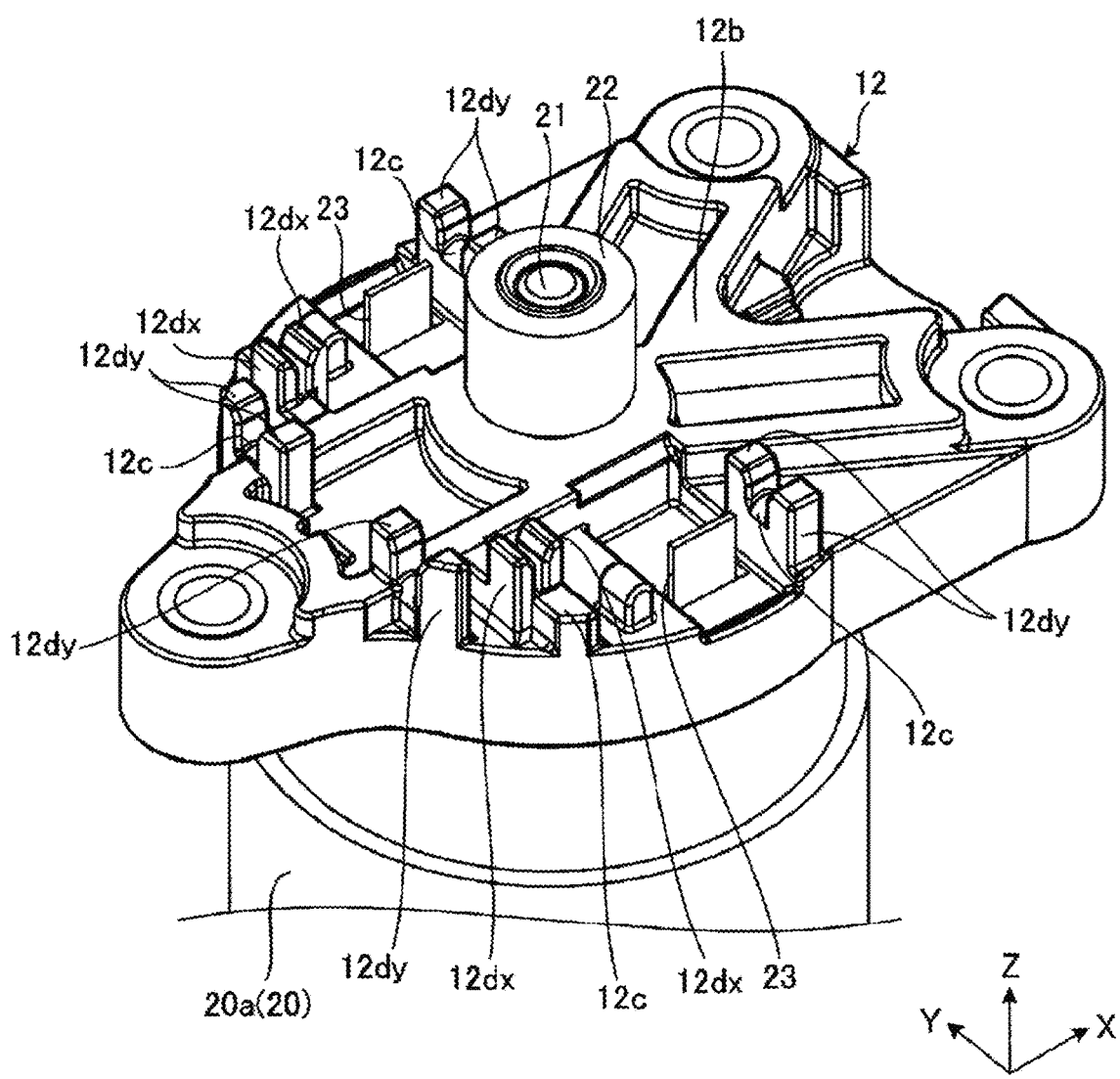
FIG. 4 is a schematic and exemplary perspective view show a state before the bus bar is attached of the subassembly of FIG. 3.
Figure 5:
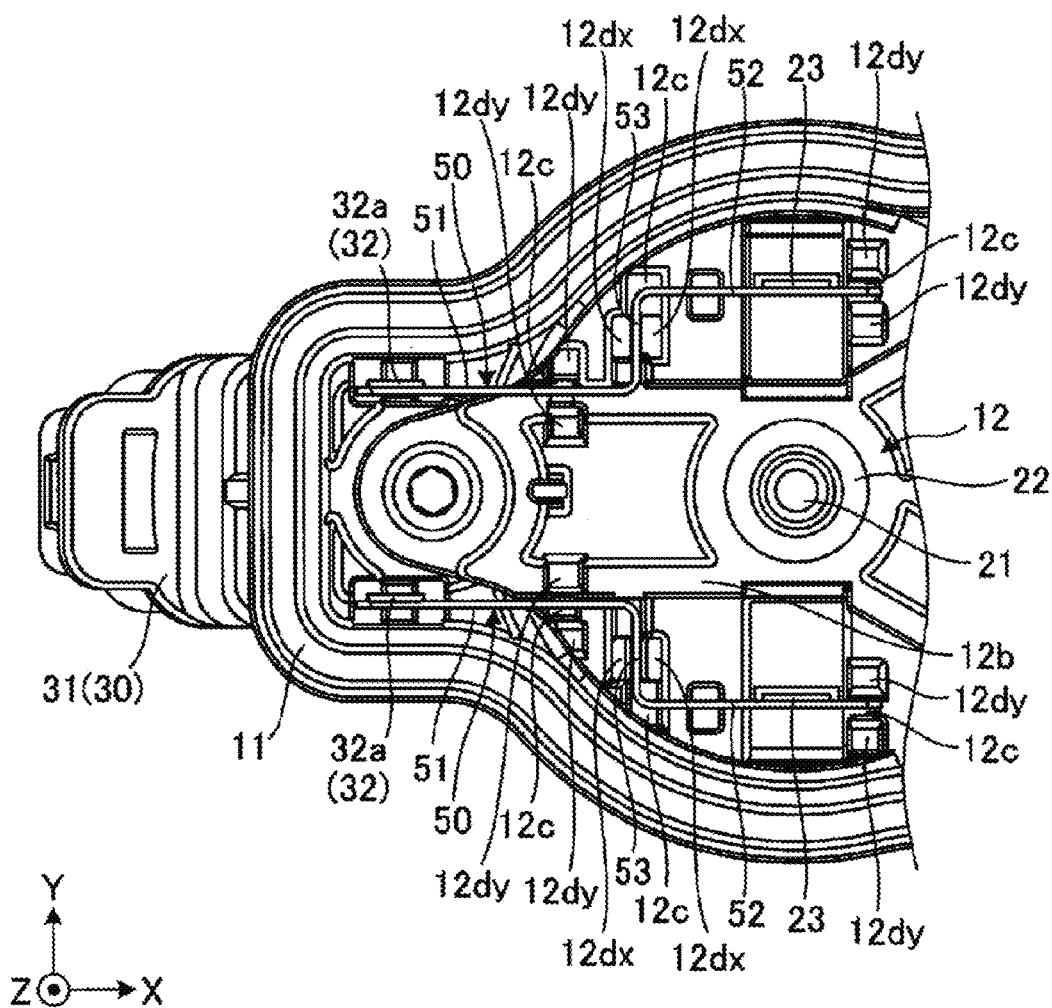
FIG. 5 is a schematic and exemplary plan view showing an internal configuration of the electric brake motor unit according to the embodiment.

FIG. 3 is a perspective view of a subassembly including the motor 20, the inner cover 12 and the two bus bars 50, FIG. 4 is a perspective view of the subassembly of FIG. 3 in a state before the bus bar 50 is attached, and FIG. 5 is a plan view showing an internal configuration of the electric brake motor unit 100.

As shown in FIG. 3, the shape of the bus bar 50 is a crank-shape. The bus bar 50 has a first section 51, a second section 52, and an intermediate section 53. As shown in FIG. 2, the first section 51 is electrically connected to the connector terminal 32, and as shown in FIGS. 2 and 3, the second section 52 is electrically connected to the motor terminal 23.

The bus bar 50 can be configured, for example, by bending a conductive metal material formed to a band plate shape into a crank shape. In the assembled state, the first section 51 and the second section 52 extend in the direction X, and the intermediate section 53 extends in the direction Y. The thickness direction of the first section 51 and the second section 52 is the direction Y, and the thickness direction of the intermediate section 53 is the direction X. Furthermore, the bus bar 50 has a substantially constant width along the direction Z from the first section 51 through the intermediate section 53 to the second section 52.

As shown in FIG. 2, the connector terminal 32 electrically connected to the first section 51 has a band plate shape having a constant width along the direction X, and extends along the direction Z. The thickness direction of the connector terminal 32 is the direction Y. The connector terminal 32 and the first section 51 overlap in the direction Y, that is, in the thickness direction of the connector terminal 32 and the first section 51. The first section 51 and the connector terminal 32 can be joined, for example, by welding such as projection welding.

As shown in FIGS. 3 and 4, the motor terminal 23 electrically connected to the second section 52 has a band plate shape having a constant width along the direction X, and extends along the direction Z. The thickness direction of the motor terminal 23 is the direction Y. The motor terminal 23 and the second section 52 overlap in the direction Y, that is, in the thickness direction of the motor terminal 23 and the second section 52. The second section 52 and the motor terminal 23 can be joined, for example, by welding such as projection welding.

As shown in FIGS. 2 and 3, in the present embodiment, the bus bar 50 is in contact with the connector terminal 32 and the motor terminal 23 electrically connected to the bus bar 50 from the back side in the same direction, that is, the direction Y. Furthermore, in the present embodiment, the two bus bars 50 are in contact with the corresponding connector terminals 32 and the motor terminals 23 from the back side in the same direction, that is, the direction Y. Therefore, in both the process of joining the first section 51 and the connector terminal 32, and the process of joining the second section 52 and the motor terminal 23, the operator or the joining device can more easily join the bus bar 50 and the connector terminal 32 and the motor terminal 23 while pressing the bus bar 50 to the connector terminal 32 and the motor terminal 23 from the back side to the front side in the same direction or the direction Y. The process of joining the first section 51 and the connector terminal 32 and the process of joining the second section 52 and the motor terminal 23 may be performed in parallel, or may be performed at shifted times.

As apparent from referencing FIG. 4 in comparison with FIG. 3, the inner cover 12 includes a supporting portion 12c for supporting the bus bar 50 in the direction Z. In the present embodiment, the supporting portion 12c is, for example, a surface (flat surface or curved surface) that is provided on a protrusion projecting out in the direction Z from the outer surface 12b of the inner cover 12 and that intersects (orthogonal) with the direction Z.

Furthermore, as apparent from referencing FIG. 4 in comparison with FIG. 3, the inner cover 12 includes a positioning portion 12dx for positioning the bus bar 50 in the direction X and a positioning portion 12dy for positioning in the direction Y. In the present embodiment, the positioning portions 12dx, 12dy are, for example, walls projecting out in the direction Z from the outer surface 12b of the inner cover 12. The two positioning portions 12dx are arranged in the direction X with a gap, and the two positioning portions 12dy are arranged in the direction Y with a gap. The bus bar 50 is arranged in a state of passing through the gap in between. The movement of the bus bar 50 in the direction Y is suppressed by the two positioning portions 12dy facing in the direction Y with a gap. That is, the positioning portion 12dy positions the bus bar 50 in the direction Y Furthermore, the movement of the bus bar 50 in the direction X is suppressed by the two positioning portions 12dx facing in the direction X with a gap. That is, the positioning portion 12dx positions the bus bar 50 in the direction X.

Moreover, the two positioning portions 12dx facing with a gap and the two positioning portions 12dy facing with a gap are respectively integrated with the supporting portion 12c, and configure a U-shaped protrusion projecting out in the direction Z from the outer surface 12b. However, such a configuration is an example, and the positioning portions 12dx and 12dy may be provided away from the supporting portion 12c.

As apparent from referencing FIG. 4 in comparison with FIGS. 3 and 5, an intermediate section 53 of the bus bar 50 is located in the gap between the two positioning portions 12dx. In the present embodiment, the two positioning portions 12dx position the intermediate section 53 extending along the direction Y in the direction X, thereby positioning the bus bar 50 in the direction X. Thus, in the present embodiment, the configuration in which the bus bar 50 is positioned in the direction X can be realized by a simpler configuration as compared with the configuration in which the other sections of the bus bar 50 are positioned.

Figure 6:
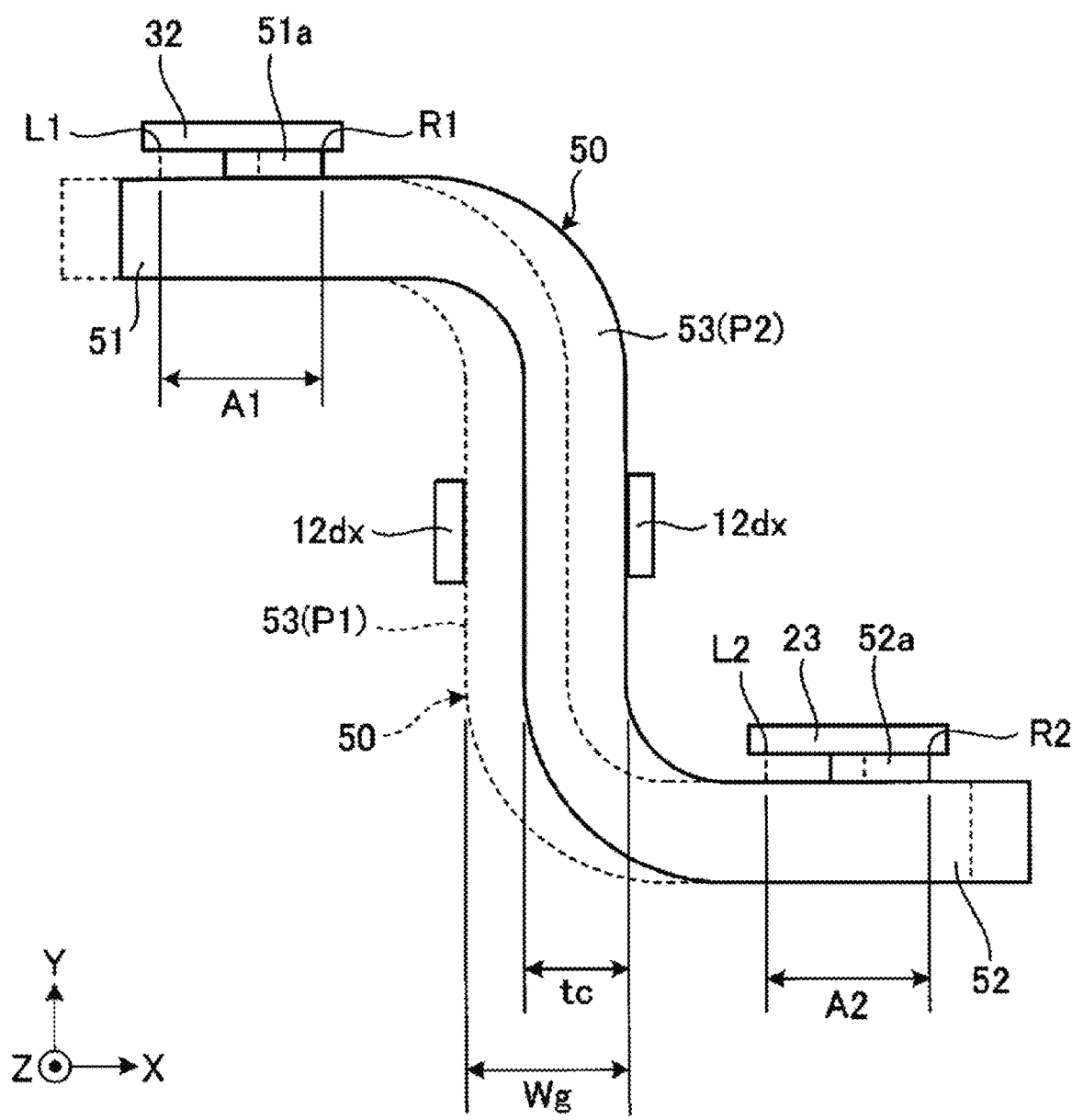
FIG. 6 is a schematic and exemplary explanatory view showing an existing range of a contact portion of a terminal and a bus bar in the electric brake motor unit according to the embodiment.

FIG. 6 is an explanatory view showing an existing range of a contact portion of the connector terminal 32 and the motor terminal 23 and the bus bar 50. In the example of FIG. 6, the first section 51 includes a first contact portion 51a electrically connected to the connector terminal 32, and the second section 52 includes a second contact portion 52a electrically connected to the motor terminal 23. In FIG. 6, although the first contact portion 51a is drawn as a portion projecting out from the first section 51, and the second contact portion 52a is drawn as a portion projecting out from the second section 52, FIG. 6 is a schematic explanatory view and the first contact portion 51a and the second contact portion 52a are drawn in an exaggerated manner. For the convenience of explanation, the dimensions of each portion are different from those in the other figures.

A gap interval Wg between the two positioning portions 12dx is larger than a thickness tc of the intermediate section 53. Therefore, the position of the intermediate section 53 (bus bar 50) is different, that is, shifted in the direction X between a case of being at a position P1 in contact with the positioning portion 12dx (left side in FIG. 6) close to the connector terminal 32 and a case of being at a position P2 in contact with the positioning portion 12dx (right side in FIG. 6) close to the motor terminal 23. That is, the position of the first contact portion 51a varies for every electric brake motor unit 100. The position P1 is an example of a first position, and the position P2 is an example of a second position. The position P1 in FIG. 6 may be an example of the second position, and the position P2 may be an example of the first position.

Here, in the present embodiment, as shown in FIG. 6, a region A1 between an end L1 on the left side of FIG. 6 of the first contact portion 51a when the intermediate section 53 is at the position P1 and an end R1 on the right side of FIG. 6 of the first contact portion 51a when the intermediate section 53 is at the position P2, that is, the existing range of the first contact portion 51a (first existing range) is configured so as to be located between the ends in the direction X of the connector terminal 32 when viewed from the direction Y.

Furthermore, in the present embodiment, a region A2 between an end L2 on the left side of FIG. 6 of the second contact portion 52a when the intermediate section 53 is at the position P1 and an end R2 on the right side of FIG. 6 of the second contact portion 52a when the intermediate section 53 is at the position P2, that is, the existing range of the second contact portion 52a (second existing range) is configured so as to be located between the ends in the direction X of the motor terminal 23 when viewed from the direction Y.

According to such a configuration, according to the present embodiment, the entire region (required region) of the first contact portion 51a can be electrically connected to the connector terminal 32 and the entire region (required region) of the second contact portion 52a can be electrically connected to the motor terminal 23 regardless of the position of the intermediate section 53 in the gap between the two positioning portions 12dx. Thus, the connector terminal 32 and the motor terminal 23 can be more reliably conducted by the bus bar 50. Note that the dimensional relationships shown in FIG. 6 can be set in consideration of the tolerance of each component, that is, the maximum value, the minimum value, and the cumulative value of each dimension.

As described above, in the present embodiment, for example, the intermediate section 53 and furthermore the bus bar 50 are positioned in the direction X (first direction) by the two positioning portions 12dx. Therefore, according to such a configuration, for example, the shift of the bus bar 50 in the direction X is suppressed, whereby the bus bar 50 and the connector terminal 32 or the motor terminal 23 can be more easily or more reliably joined compared to a case where the positioning portion 12dx is not provided. Furthermore, the configuration for positioning bus bar 50 can be realized by a relatively simple configuration.

Moreover, in the present embodiment, for example, the bus bar 50 is brought into contact with both the connector terminal 32 and the motor terminal 23 from the back side (same direction) in the direction Y. Therefore, according to such a configuration, for example, the bus bar 50 can be joined to both the connector terminal 32 and the motor terminal 23 more easily from the same direction.

Furthermore, in the present embodiment, for example, configuration is made such that the existing range (region A1, first existing range) of the first contact portion 51a when the intermediate section 53 is located between the position P1 (first position) in contact with one of the two positioning portions 12dx and the position P2 (second position) in contact with the other positioning portion is located between the ends in the direction X (first direction) of the connector terminal 32 when viewed from the direction Y (second direction), and the existing range (region A2, second existing range) of the second contact portion 52a when the intermediate section 53 is located between the position P1 and the position P2 is located between the ends in the direction X (first direction) of the motor terminal 23 when viewed from the direction Y (second direction). Therefore, according to such a configuration, for example, in a state in which the intermediate section 53 is positioned by the two positioning portions 12dx, the first contact portion 51a of the bus bar 50 and the connector terminal 32 more reliably overlap, and the second contact portion 52a of the bus bar 50 and the motor terminal 23 more reliably overlap. Therefore, for example, the connector terminal 32 and the motor terminal 23 can be more reliably conducted by the bus bar 50.

Furthermore, in the present embodiment, for example, the electric brake motor unit 100 includes the speed reduction mechanism 40 (brake operation speed reduction mechanism), and the speed reduction mechanism 40 is provided integrally with the inner cover 12 (motor bracket).

According to such a configuration, various effects described above can be obtained, for example, in the electric brake motor unit 100 that integrally includes the brake operation speed reduction mechanism 40.

In addition, as a modified example, the electric brake motor unit 100 may include, for example, two bus bars 50 having the same shape. According to such a configuration, for example, the trouble and cost of manufacturing are further reduced compared with a case in which the two bus bars 50 have different specifications.

The embodiment of the present invention has been exemplified above, but the embodiment described above is merely an example and is not intended to limit the range of the present invention. The embodiment described above can be implemented in various other forms, and various omissions, replacements, combinations, and changes can be made within a scope not deviating from the gist of the invention. In addition, the specifications of each configuration, shape, and the like (structure, type, direction, shape, size, length, width, thickness, height, number, arrangement, position, material, etc.) can be appropriately changed and implemented.

For example, in a case where the electric brake motor unit 100 described in the above embodiment is applied to an electric drum brake, it may be configured such that a shoe (friction material) of the drum brake is driven by the rotation of the output shaft 46 of the planetary gear mechanism 42 (speed reduction mechanism 40).

Furthermore, for example, the electric brake motor unit of the present invention is applicable not only to an electric parking brake but also to an electric service brake.

The invention claimed is:

1. An electric brake motor unit comprising:
   a motor serving as a power source including a motor terminal and being configured to drive a brake operation speed reduction mechanism;
   a connector having a connector terminal;
   a bus bar that includes a first section including a first contact portion extending in a first direction and electrically connected to the connector terminal, a second section including a second contact portion extending in the first direction and electrically connected to the motor terminal, and an intermediate section extending in a second direction intersecting the first direction between the first section and the second section, the first section, the intermediate section, and the second section being connected to a crank shape; and
   a motor bracket mounted on the motor and including two positioning portions located away from each other with a gap through which the intermediate section passes and configured to position the intermediate section in the first direction;
   wherein an entirety of a first existing range of the first contact portion when the intermediate section is located between a first position in contact with one of the two positioning portions and a second position in contact with the other positioning portion is located between ends in the first direction of the connector terminal when viewed from the second direction, and an entirety of a second existing range of the second contact portion when the intermediate section is located between the first position and the second position is located between ends in the first direction of the motor terminal when viewed from the second direction.

2. The electric brake motor unit according to claim 1, wherein the bus bar is in contact with both the connector terminal and the motor terminal from the same direction.

3. The electric brake motor unit according to claim 1, comprising two of the bus bars having the same shape.

4. The electric brake motor unit according to claim 1, further comprising the brake operation speed reduction mechanism, wherein
   the brake operation speed reduction mechanism is provided integrally with the motor bracket.

5. The electric brake motor unit according to claim 1, wherein the first contact portion is a portion formed projecting out from the first section, electrically connected by welding to the connector terminal extending in a direction orthogonal to the first and second directions, and the second contact portion is a portion formed projecting out from the second section, electrically connected by welding to the motor terminal extending in the direction orthogonal to the first and second directions.

* * * * *